United States Patent [19]

Galer et al.

[11] Patent Number: 4,488,909

[45] Date of Patent: Dec. 18, 1984

[54] NON-EXPANSIVE, RAPID SETTING CEMENT

[75] Inventors: Richard E. Galer, Hanover Park; Paul C. Webb, Lake Villa, both of Ill.

[73] Assignee: United States Gypsum Company, Chicago, Ill.

[21] Appl. No.: 555,136

[22] Filed: Nov. 25, 1983

[51] Int. Cl.$^3$ ................................................. C04B 7/35
[52] U.S. Cl. ..................................... 106/89; 106/104; 106/109; 106/118
[58] Field of Search ............... 106/89, 104, 109, 118

[56] References Cited

U.S. PATENT DOCUMENTS

| | | | |
|---|---|---|---|
| 3,775,143 | 11/1973 | Mikhailov et al. | 106/89 |
| 3,861,929 | 1/1975 | Deets et al. | 106/89 |
| 3,997,353 | 12/1976 | Chervenka et al. | 106/89 |
| 4,310,358 | 1/1982 | Azuma et al. | 106/97 |
| 4,350,533 | 9/1982 | Galer et al. | 106/89 |

*Primary Examiner*—James Poer
*Attorney, Agent, or Firm*—Robert M. Didrick; Samuel Kurlandsky; Robert H. Robinson

[57] ABSTRACT

An ettringite-producing hydraulic cement especially adapted to the high speed production of carbon dioxide resistant cement board produces essentially all of its potential ettringite within about 20 minutes after it is mixed with water. The cement is non-expansive and sets within about 25 minutes at a temperature of from about 65° F. to about 150° F.

9 Claims, No Drawings

NON-EXPANSIVE, RAPID SETTING CEMENT

This invention relates to a hydraulic cement for the continuous casting of structural panels suitable for use in the construction of walls, ceilings, floors and the like. More particularly, it relates to a cement which will impart to such a panel the properties of high strength at an early age, high strength at high temperatures at a later age, and excellent resistance to carbon dioxide attack at such later age.

A description of cement technology suitable for an understanding of the background of the present invention can be found in Scientific American, April 1964, pages 80–90; Kirk-Othmer's Encyclopedia of Chemical Technology, 2d ed., Vol. 5, pages 684–710 (1964); and ACI Journal, August, 1970, pages 583–610. The following abbreviations for the cumbersome formulas of cement compounds will be used herein in accordance with the general practice in the cement industry:

C represents calcium oxide (CaO)
A represents aluminum oxide ($Al_2O_3$)
H represents water ($H_2O$)
$\bar{S}$ represents sulfur trioxide ($SO_3$)

Thus, ettringite is $C_3A(C\bar{S})_3H_{32}$.

The term "hydraulic cement" as used herein, is understood to include any cement which has the characteristic of hardening under water, e.g., portland cement, blends of portland cement and high alumina cement, mixtures of portland cement and blast-furnace slag, and like materials. The term "concrete" is used to designate a mixture of hydraulic cement, aggregate, and water which sets to form a hard mass. The term "mortar" is used herein to designate a mixture of hydraulic cement, fine aggregate and water.

Reinforced cementitious panels are presently known. U.S. Pat. No. 3,284,980 (Dinkel) teaches a pre-cast, lightweight concrete panel having a cellular core, a thin, high density layer on each face, and a layer of fiber mesh embedded in each of the high density layers. The cements taught to be useful are exemplified by portland cements, highearly cements, alumina cements, natural cements, etc. Clear, in U.S. Pat. No. 4,203,788, discloses a continuous method for the production of the panels taught by Dinkel. Clear warns that flexing of the uncured panel causes the various layers to move with respect to each other and to separate, thereby destroying the integrity of the panel and reducing its strength. The forming, cutting, and stacking operations in Clear are all designed to minimize flexing of the uncured panel.

In U.S. Pat. No. 4,159,361, Schupack teaches a reinforced panel structure which has a unitary, non-segmented core made from a cementitious mixture. It is taught that if a quick set cement is used, the panel can be cured in the open air in approximately 30 minutes. However, the "stack casting" of individual panels, one on top of another after each has undergone initial set, indicates that handling of the uncured panels is to be avoided.

Quick set cements and high early strength cements are well known. Spackman et al, in U.S. Pat. No. 903,019, teach that the addition of from 2 to 20% of calcium aluminate, from 1 to 3% of calcium sulfate and from 5 to 20% of hydrated lime to natural cement or mixtures of natural cement and portland cement produces a cement having greater tensile strength at all ages.

In U.S. Pat. No. 3,775,143, Mikhailov et al state that a mixture of 62% portland cement, 20% alumina cement, 14% gypsum, and 4% lime provides a concrete having a compressive strength of 4950 p.s.i. (34.13 MPa) after one day and 6500 p.s.i. (44.82 MPa) after 28 days.

Chervenka et al teach in U.S. Pat. No. 3,997,353 that a cement comprising from 45 to 70% portland cement, from 25 to 45% of additional calcium aluminate, from 5 to 20% calcium sulfate develops a compressive strength of at least 1000 p.s.i. (6.9 MPa) in 2 hours or less. An amount of free lime greater than 2% of the weight of the portland cement is said to be deleterious.

Deets et al, in U.S. Pat. No. 3,861,929, teaches a controlled expansive cement containing portland cement, an amount of calcium aluminate cement equal to about 2 to 17% of the weight of the portland cement, and an amount of calcium sulfate equivalent to about 2 to 24% excess $SO_3$ over the optimum level of $SO_3$ for the particular portland cement used. Thus, the actual amount of calcium sulfate used, if the optimum level of $SO_3$ were 3%, would be about 8.5 to 44.2% of the weight of portland cement. The 7-day compressive strengths reported are less than 4300 p.s.i.

Galer et al teach in U.S. Pat. No. 4,350,533 that the maximum early age strength of cementitious compositions comprising mixtures of high alumina cement, gypsum and a source of available lime is achieved when the weight of ettringite produced in the early stages of hydration is equal to from about 40% to about 60% of the weight of the paste fraction (i.e., water+cement) of the composition. The hydraulic cement powder which produces the ettringite comprises from about 18% to about 65% high alumina cement, from about 16% to about 35% calcium sulfate and from about 3.5% to about 8.5% calcium oxide. Depending upon the source chosen for the calcium oxide, the cement comprises from 0% to about 65% portland cement and from 0% to about 8.5% of extraneous lime. The early strength of concrete made from such cement is indeed high but the high ettringite content makes it unstable at high temperatures and susceptible to degradation by carbon dioxide.

One solution to the problem of carbon dioxide attack on concretes containing ettringite is offered by Azuma et al in U.S. Pat. No. 4,310,358. Calculated amounts of an ettringite precursor, gypsum and a cement material selected from a group consisting of portland cement, blast furnace slag and mixtures of said cement and said slag are blended and then hydrated to form a product comprising a four component system of ettringite, gypsum, ettringite precursor and the hardened product of the cement material. The ratio of ettringite produced to the dry cement material must be between 5:1 and 1:5 by weight and the ratio of ettringite precursor to gypsum in the initial blend must be between 10:1 and 1:1 by weight. Azuma et al teaches that an aging and hardening process must be initiated within 4–8 hours after the cement mixture is shaped into an article. The aging temperature is about 80° C. (176° F.) to 90° C. (194° F.) and the process is carried out in a moist atmosphere for from 6 to 48 hours. Expansion of the shaped product occurs because of the rapid formation of ettringite if the aging temperature is lower than 176° F. but the rate of formation of ettringite is too slow at a temperature above 194° F., according to Azuma et al.

There still remains a need, therefore, for a non-expansive hydraulic cement which will hydrate to give a cementitious product having a high early strength but is resistant to carbon dioxide attack and is stable at high temperatures. There is a particular need in the cement board industry for a hydraulic cement which will set quickly and have a high early strength so that the cement board may be produced on a high speed, continuous production line, and have a high ultimate strength which is not degraded by the carbon dioxide in the air or by exposure to high temperatures, as in a burning building.

It is an object of this invention to provide a hydraulic cement which will set and develop strength fast enough after mixing with water to allow the production of cement board at about 20 to about 150 lineal feet per minute.

It is a related object of this invention to provide a hydraulic cement which will develop enough strength during the manufacture of cement board to allow for cutting and handling of the board about 20 minutes after hydration of the cement.

It is another related object of this invention to provide a hydraulic cement which will develop such early strength by the limited production of high strength ettringite yet develop most of its ultimate strength from hydrated calcium silicates.

It is a further object of this invention to provide a hydraulic cementitious composition which develops high early strength yet is stable at high temperatures and is resistant to carbon dioxide degradation.

These and other objects which will become apparent from the following description are achieved by a nonexpansive, ettringite producing hydraulic cement which upon hydration at a temperature of from about 65° F. to about 150° F. (about 18° to about 66° C.) produces substantially all of its potential ettringite in from about 5 minutes to about 20 minutes after mixing with water, and which produces a rapid hardening cementitious product which is resistant to carbon dioxide attack, is stable at high temperatures and has a high early strength, said hydraulic cement comprising from about 72% to about 80% portland cement, from about 14% to about 21% high alumina cement, from about 3.5% to about 10% calcium sulfate and from about 0.4% to about 0.7% hydrated lime.

High alumina cement, known also as aluminous cement, has an $Al_2O_3$ content of about 36–42%. The most important compounds present are the several calcium aluminates, primarily CA. The amount of alumina that can be converted to ettringite from high alumina cement in a short enough time period after mixing with water to produce fast setting characteristics is primarily dependent on the amount of very fine aluminate particles available for solution in the mix water. In order for the reaction to proceed rapidly, aluminate ions must be present in the aqueous phase of the cementitous mixture. The reaction of CA, C, and $C\bar{S}$ to yield ettringite proceeds rapidly when continuous saturation of the aqueous phase is promoted by the presence of very small aluminate particles and/or crystals formed at low fusion temperatures. Thus, a large amount of high alumina cement having a small percentage of fine particles or a small amount of the cement having a high percentage of fine particles is desirable. Regrinding of the high alumina cement to a higher fineness allows the utilization of more of the alumina for the production of ettringite within a short period of time. The surface area of the high alumina cement may be from about 3000, more often, 4000 sq. cm./gram to about 9000 sq. cm./gram, as measured by the Blaine method. The amount of high alumina cement in the cement powder of this invention is preferably from about 14% to about 18%; a more preferred amount is from about 15% to about 17%.

The amount of calcium sulfate in the hydraulic cement of this invention is the controlling factor in the production of ettringite during hydration. The calcium sulfate may be in the form of gypsum, the hemihydrate, anhydrite, or synthetic $C\bar{S}$. Because calcium sulfate is the most soluble of the reactants in the hydration reactions, its particle size is not so critical to the speed of the hydration. Substantially all of it is consumed. A preferred amount of calcium sulfate is from about 4% to about 8%. More preferably, the amount is from about 5% to about 7%. Various grades of gypsum, such as landplaster and terra alba, may be used but a minimum purity of about 90% is desirable.

A type III portland cement is preferred. Type I portland cement may be used but the strength of a mortar or concrete at the intermediate ages will be lower. The preferred amount of portland cement is from about 73% to about 76%, especially from about 74% to about 75%. As with the high alumina cement, the Blaine values for the portland cement, gypsum and lime may be in the 3000–9000 sq. cm./gram range. A preferred range for the portland cement is from about 5000 to about 6000 sq. cm./gram.

A preferred formulation for the cement powder comprises from about 0.5 to about 0.7% slaked lime. A particularly preferred blend of powders consists essentially of about 74.8% type III portland cement, about 17% high alumina cement, about 7.5% landplaster (i.e., about 5.3% calcium sulfate), and about 0.65% slaked lime.

When the cement board is to be used for interior paneling such as tile backer board, ceiling panel, or as an underlayment for floors and the like, it is desirable to use a lightweight aggregate to help make the board as light as possible while still retaining strength. Lightweight aggregates such as blast furnace slag, volcanic tuff, pumice and the expanded forms of shale, perlite, clay, and vermiculite may also be added to the cementitious compositions of this invention. Expanded polystyrene beads are also very useful as is the use of foaming agents to entrain air in the hardened mortar. The cementitious compositions of this invention may, however, contain sand, gravel, and other heavier aggregates when it is desired to make other objects or heavyweight cement boards for use in the construction of curtain walls and the like. Although the particle size distribution should be rather broad to avoid close packing of the aggregate, the maximum size of the aggregate used in cement board manufacture should be about one-third of the thickness of the board. The weight ratio of the mineral aggregate to the cement powder may range from about 0.9:1 to about 6:1 but, when making cement board, it is preferably not greater than about 3:1. The weight ratio of blast furnace slag to the cement powder, for example, is preferably from about 1:1 to about 2:1.

The cementitious compositions of this invention include the hydraulic cement, i.e. the cement, and the various concretes, mortars and grouts, that may be made therefrom. The water/cement powder ratio used in mixing the cementitious compositions may be from about 0.25:1 to about 0.8:1 by weight but it is preferred to use a ratio of from about 0.3:1 to about 0.5:1. The amount of water is determined at least partially by the affinity for water by each of the components and by the surface area thereof. The cementitious compositions of this invention may also contain pozzolanic materials such as fly ash, montmorillonite clay, diatomaceous earth, and pumicite. The amount may be as much as about 25% of the weight of the cement powder but it is preferably from about 5% to about 20%. The high water demand of fly ash must be taken into account when determining the amount to be used.

In casting procedures where it is desirable to have a substantially self-leveling mortar or concrete yet one which has a low water/cement ratio so as to yield a strong hardened material, such as in the manufacture of cement board on a continuously moving conveyor belt, the use of a water reducing agent or plasticizer is preferred. The sodium salt of the sulfonic acid of a naphthalene/formaldehyde condensation product, sold under the trademarks LOMAR D and PROTEX is known as a super plasticizer. A water soluble polymer prepared by the condensation of melamine and formaldehyde and sold under the MELMENT trademark is another example of a super plasticizer.

In the manufacture of cement board, the hydraulic cement of this invention, water, an aggregate such as blast furnace slag, and the other constituents of the mortar are charged into a continuous mixer by feeders calibrated to deliver the constituents in the proportions described hereinabove. The mix water temperature ranges from about 85° F. to about 140° F. (30°-60° C.) and the mortar temperature as it leaves the mixer is from about 65° F. to about 110° F. (18°-43° C.), preferably about 90° F. (32° C.) or higher.

The formation of ettringite is essentially complete in from about 5 minutes to about 20 minutes after mixing at a mortar temperature of from about 65° F. to about 150° F. The final set of the mortar, substantially all of which is due to formation of ettringite and $C_3AH_6$, occurs in from about 9 to about 25 minutes from the moment of mixing. The withdrawal of 46 parts of mix water from the mortar mix for the formation of each 100 parts of ettringite quickly consumes a large part of the mix water and causes the mortar to become firm. This, in addition to the formation of the $C_3AH_6$, causes the early setting of the mortar. The rapid formation of ettringite and $C_3AH_6$ imparts early strength to the board so that it may be cut and stacked at such an early age. Curing of the stacked boards continues to generate heat. When a forty board stack of one-half inch thick boards, covered to preserve a moist atmosphere, was allowed to stand in a room having an ambient temperature of 57° F. (14° C.), the temperature within the stack reached a maximum of 203° F. (96° C.) in about 15 hours. The heat thus generated does not reduce the strength of the board, however, because formation of the ettringite is complete before the temperature begins to rise and the ultimate strength of the board does not suffer if a small amount of ettringite decomposes at the maximum temperature.

The following examples illustrate hydraulic cements of this invention which are useful in the manufacture of cement board. All parts are by weight unless otherwise specified.

EXAMPLE 1

A cement powder containing 75 parts of Type III portland cement, 19 parts of high alumina cement, 5.5 parts of landplaster (3.9 parts of calcium sulfate), and 0.5 part of slaked lime was mixed with 100 parts of an expanded blast furnace slag, 35 parts of cool water and 1 part of a super-plasticizer (Lomar D) and the mortar was cast into 2-inch cubes. The Gillmore set times are 62 minutes (initial) and 108 minutes (final). Two batches of cubes, one as a control and one for testing of heat stability, were cast. Cubes destined for heat treatment were stored at room temperature in moist air until heat treatment was commenced; control cubes were so stored until tested for compressive strength. At 1 day, 7 days, and 28 days after the addition of mix water, one cube was placed in an oven maintained at 230°±9° F. (110°±5° C.) for 24 hours and then removed and allowed to cool to room temperature. The heat treated cube and a control cube of equal age were tested for compressive strength. The results, shown in Table I, indicate that, rather than being weakened by the heat treatment, the hardened mortar gains strength.

TABLE I

| Heat Treatment | Compressive Strength p.s.i. | MPa | Change % |
|---|---|---|---|
| 1 Day | 7875 | 54.30 | +22.45 |
| Control | 6431 | 44.34 | |
| 7 Days | 8075 | 55.68 | +10.43 |
| Control | 7313 | 50.42 | |
| 28 Days | 9275 | 63.95 | +13.11 |
| Control | 8200 | 56.54 | |

EXAMPLES 2-6

Six self-leveling mortars were prepared by mixing cements having the formulations shown in Table II with 298 mls. of a mix water containing 13.9 mls. of a super-plasticizer (Protex PSP-N2, a sodium sulfonate of a naphthalene/formaldehyde condensate, 40% solids).

TABLE II

| Component | Example No. | | | | |
|---|---|---|---|---|---|
| | 2 | 3 | 4 | 5 | 6 |
| Portland cement Type III, Peerless brand | 79.5 | 77.5 | 75.5 | 72 | 76.45 |
| High alumina cement Lumnite brand | 14.0 | 16.0 | 18.0 | 17.5 | 17.41 |
| Calcium sulfate* | 6.0 | 6.0 | 6.0 | 10.0 | 5.47 |
| Hydrated lime | 0.5 | 0.5 | 0.5 | 0.5 | 0.67 |
| Blast furnace slag | 100 | 100 | 100 | 100 | 100 |

*Added as landplaster which contained 71.1% CS

The mix water and all of the components had been preheated to 100° F. (38° C.). The initial and final Gillmore set times were determined on one set of cubes. Other sets of cubes were cured in moist air at 100° F. for 30 minutes and then at 73° F. (23° C.) for the remainder of the curing periods shown in Table III before being broken in the compressive strength test of the ASTM C 109-80 procedure. A final set of cubes was cured for 20 hours in moist air (at 100° F. for 30 minutes and at 73° F. for 19.5 hours) and then the cubes were immersed in water at 73° F. for the remainder of a 7 day period. The mortar in Example 5 had a density of 130.5 pounds per cubic foot (2.09 g/cc); the other mortars had a similar density. The set times and the compressive strengths are given in Table III.

TABLE III

| Example No. | Set (min.) | | Compressive Strength (psi)* | | | 7 Days | |
|---|---|---|---|---|---|---|---|
| | Initial | Final | 1 Hr. | 3 Hrs. | 24 Hrs. | Moist Air | Underwater |
| 2 | 7 | 14 | 1765 | 2490 | 5813 | 7750 | 7825 |
| 3 | 4 | 15 | 2305 | 2375 | 4175 | 7600 | 7325 |
| 4 | 5 | 9 | 2490 | 2675 | 3743 | 6725 | 6600 |
| 5 | 5 | 13 | 2065 | 2910 | 6700 | 7800 | 8050 |

TABLE III-continued

| Example No. | Set (min.) Initial | Set (min.) Final | Compressive Strength (psi)* 1 Hr. | 3 Hrs. | 24 Hrs. | 7 Days Moist Air | 7 Days Under- water |
|---|---|---|---|---|---|---|---|
| 6 | 6 | 9 | 2545 | 2895 | 3823 | 7375 | 7100 |

* $\frac{psi}{MPa}$ 145

EXAMPLE 7

Cement board was manufactured from continuously mixed mortar having a water/cement powder weight ratio of 0.35:1. The cement powder consisted of 73% Type III portland cement, 16.6% high alumina cement, 7.3% landplaster (5.2% $C\bar{S}$), 2.4% Class C fly ash, and 0.7% $CH_2$, by weight. The mortar also contained blast furnace slag, a superplasticizer, a foaming agent, and expanded polystyrene beads. After cutting the continuous panel, the individual cement boards were stacked and wrapped for further curing. After curing in the stack for 7 days, samples of the boards were taken from the stacks and stored until they were 2 months old and then were placed in a carbonation chamber in which the atmosphere was 100% carbon dioxide except for the water vapor necessary to give a relative humidity of 95% at 73° F. After four weeks of exposure to the carbon dioxide, the average weight gain of the boards was 7.2% and the modulus of rupture was about 95% of the value before the test began. The impact resistance of boards taken from the carbonation chamber after 2 weeks was 73% of the value before the test began. The impact resistance of boards exposed for 4 weeks was not measured.

While several particular embodiments of this invention have been described, it will be understood that the invention may be modified within the spirit and scope of the appended claims.

What is claimed is:

1. A non-expansive, ettringite-producing hydraulic cement which produces a cementitious product which is resistant to carbon dioxide attack, is stable at high temperatures and has a high early strength, said hydraulic cement comprising from about 72% to about 80% portland cement, from about 14% to about 21% high alumina cement, from about 3.5% to about 10% calcium sulfate and from about 0.4% to about 0.7% hydrated lime, by weight.

2. The hydraulic cement of claim 1 wherein the portland cement ranges from about 73% to about 76%, the high alumina cement ranges from about 14% to about 18%, the calcium sulfate ranges from about 4% to about 8% and the hydrated lime ranges from about 0.5% to about 0.7%.

3. The hydraulic cement of claim 1 wherein there is from about 74% to about 75% portland cement, from about 15% to about 17% high alumina cement, from about 5% to about 7% calcium sulfate, and from about 0.5% to about 0.7% hydrated lime.

4. The hydraulic cement of claim 1 wherein there is about 74.8% portland cement, about 17% high alumina cement, about 5.3% calcium sulfate and about 0.65% hydrated lime.

5. The hydraulic cement of claim 1 wherein the portland cement is Type III.

6. A non-expansive, ettringite-containing cementitious composition comprising the hydration products of a hydraulic cement comprising from about 72% to about 80% portland cement, from about 14% to about 21% high alumina cement, from about 3.5% to about 10% calcium sulfate and from about 0.4% to about 0.7% hydrated lime, by weight.

7. The composition of claim 6 wherein the hydraulic cement comprises from about 73% to about 76% portland cement, from about 14% to about 18% high alumina cement, from about 4% to about 8% calcium sulfate and from about 0.5% to about 0.7% hydrated lime.

8. The composition of claim 6 wherein the hydraulic cement comprises from about 74% to about 75% portland cement, from about 15% to about 17% high alumina cement, from about 5% to about 7% calcium sulfate, and from about 0.5% to about 0.7% hydrated lime.

9. The composition of claim 6 wherein the hydraulic cement comprises about 74.8% portland cement, about 17% high alumina cement, about 5.3% calcium sulfate and from about 0.5% to about 0.7% hydrated lime.

* * * * *